US010039064B1

(12) United States Patent
Gibbons

(10) Patent No.: US 10,039,064 B1
(45) Date of Patent: Jul. 31, 2018

(54) SYSTEMS AND METHODS FOR OPTIMIZING BROADCASTS

(71) Applicant: Michael L. Gibbons, Lake Stevens, WA (US)

(72) Inventor: Michael L. Gibbons, Lake Stevens, WA (US)

(73) Assignee: Michael L. Gibbons, Lake Stevens, WA (US)

( * ) Notice: Subject to any disclaimer, the term of this patent is extended or adjusted under 35 U.S.C. 154(b) by 8 days.

(21) Appl. No.: 13/974,273

(22) Filed: Aug. 23, 2013

Related U.S. Application Data

(63) Continuation of application No. 13/681,368, filed on Nov. 19, 2012, now Pat. No. 8,554,264, and a continuation of application No. 13/972,882, filed on Aug. 21, 2013, now Pat. No. 9,425,843, and a continuation of application No. 13/940,532, filed on Jul. 12, 2013, now abandoned.

(60) Provisional application No. 61/561,258, filed on Nov. 17, 2011.

(51) Int. Cl.
*H04B 7/00* (2006.01)
*H04W 52/28* (2009.01)

(52) U.S. Cl.
CPC ................ *H04W 52/283* (2013.01)

(58) Field of Classification Search
None
See application file for complete search history.

(56) References Cited

U.S. PATENT DOCUMENTS

| 6,334,047 | B1* | 12/2001 | Andersson et al. ............ 455/69 |
| 6,421,528 | B1* | 7/2002 | Rosen et al. ................ 455/67.16 |
| 6,580,911 | B1* | 6/2003 | Clancy ........................... 455/446 |
| 6,690,939 | B1* | 2/2004 | Jonsson et al. ............... 455/453 |
| 8,160,574 | B1* | 4/2012 | Nelson ........................ 455/426.2 |
| 2002/0065586 | A1* | 5/2002 | Sample ................... G01S 1/045 701/3 |
| 2003/0224801 | A1* | 12/2003 | Lovberg ................ H01Q 1/125 455/454 |
| 2007/0274226 | A1* | 11/2007 | Tillotson ....................... 370/252 |
| 2009/0291641 | A1* | 11/2009 | Sato et al. ................. 455/67.11 |

(Continued)

*Primary Examiner* — Zhiyu Lu

(74) *Attorney, Agent, or Firm* — Puget Patent; Michael Gibbons

(57) ABSTRACT

Optimizing a power level for a transmission so that the transmission is receivable at or near a destination, but no farther, is useful for reduced-power transmissions. Taking into account known distance for the transmission as determined by onboard GPS and geographic databases, a power level may be set more precisely. Accounting for atmospheric conditions which may impact transmission as determined by onboard or received measurements of temperature, solar or other conditions may also permit a power level to be set more precisely. An obstruction database may be consulted to determine whether transmissions will degrade due to objects in between the transmitter and receiver, permitting power level, frequency, bandwidth or transmit/receive location to be adjusted accordingly. The techniques may be implemented in any signal transmission scenario including mobile telephones, aircraft, marine or other vehicle radios, mobile devices with Wi-Fi radios for network computing, stationary radios, and other situations requiring communications.

21 Claims, 8 Drawing Sheets

(56) References Cited

U.S. PATENT DOCUMENTS

| | | | |
|---|---|---|---|
| 2009/0316671 A1* | 12/2009 | Rolf et al. | 370/338 |
| 2009/0318138 A1* | 12/2009 | Zeng | H04B 7/18506 455/431 |
| 2010/0256841 A1* | 10/2010 | Garrec | G01S 13/82 701/17 |
| 2012/0021694 A1* | 1/2012 | Prince et al. | 455/68 |
| 2012/0076007 A1* | 3/2012 | Nelson | H04W 52/24 370/252 |

* cited by examiner

SYSTEMS AND METHODS FOR OPTIMIZING BROADCASTS

PRIORITY CLAIM

The present application constitutes a divisional application of U.S. patent application Ser. No. 13/681,368, entitled SYSTEMS AND METHODS FOR OPTIMIZING BROADCASTS, naming MICHAEL L. GIBBONS and ROBERT J. GIBBONS as inventors, filed 19 Nov. 2012, which is currently co-pending, and further claims the benefit of U.S. application Ser. No. 13/940,532, entitled SYSTEMS AND METHODS FOR OPTIMIZING BROADCASTS, naming MICHAEL L. GIBBONS and ROBERT J. GIBBONS as inventors, filed 12 Jul. 2013, which is currently co-pending, and further claims the benefit of U.S. application Ser. No. 13/972,882, entitled SYSTEMS AND METHODS FOR OPTIMIZING BROADCASTS, naming MICHAEL L. GIBBONS and ROBERT J. GIBBONS as inventors, filed 21 Aug. 2013, which is currently co-pending, and further claims the benefit of U.S. provisional patent application Ser. No. 61/561,258 filed Nov. 17, 2011. The foregoing applications are incorporated by reference in their entirety as if fully set forth herein.

FIELD OF THE INVENTION

This invention relates generally to broadcasts, and more specifically, to systems and methods for optimizing broadcasts.

BACKGROUND

Advances in integration make possible new ways of optimizing transmissions, through incorporating real-time (or near real-time) information not previously readily accessible, enabling decision-making and real-time (or near real-time) adjustments in transmission operations.

SUMMARY

An embodiment provides a method that includes determining a destination for a broadcast. The method also includes receiving at least one signaling parameter associated with a condition affecting the broadcast. The method also includes adjusting at least one broadcasting parameter for optimizing reception of the broadcast at the destination. The method may include determining a geographic range surrounding a point for reception of a broadcast. The method may include receiving GPS coordinates associated with at least one of the transmitter of the broadcast or the destination of the broadcast. The method may include receiving at least one air temperature associated with at least one of the transmitter of the broadcast or the destination of the signal broadcast. The method may include receiving at least one atmospheric condition associated with at least one of the transmitter of the broadcast or the destination of the signal broadcast. The method may include receiving at least one interference condition associated with at least one of the transmitter of the signal broadcast or the destination of the signal broadcast. The method may include receiving one or more at least partial obstructions associated with at least one path between the transmitter of the signal broadcast or the destination of the signal broadcast. The method may include receiving at least one altitude associated with at least one of the transmitter of the broadcast or the destination of the broadcast. The method may include receiving at least one density of the medium through which the broadcast is transmitted between the transmitter of the broadcast and the destination of the broadcast. The method may include receiving from one or more of a database associated with the hardware, a sensor associated with the hardware, or at least one other transmission at least one signaling parameter associated with a condition affecting the broadcast. The method may include adjusting one or more signal strengths for the broadcast. The method may include adjusting one or more frequency bandwidths for the broadcast. The method may include adjusting one or more frequencies for the broadcast. In an alternate embodiment, the method may further include determining at least one alternate destination for the broadcast. In addition to the foregoing, other method embodiments are described in the claims, drawings and text that form a part of the present application.

An embodiment provides a method that includes receiving an area associated with transmitted broadcasts. The method also includes determining a minimum signal strength corresponding with the area. The method also includes adjusting a receive selectivity for filtering broadcasts below the minimum signal strength. The method may include determining a geographic range surrounding a point for transmitted broadcasts, the geographic range including points from which transmitted broadcasts are not filtered. The method may include adjusting a receive selectivity for a receiver based at least in part on the distance between the receiver and a geographic point. The method may include determining a minimum signal strength corresponding with the area based at least in part on one or more of a temperature, an atmospheric condition, a density associated with a medium through which the broadcasts are transmitted, a frequency bandwidth, a frequency, an altitude, or an at least partial obstruction. The method may include receiving from one or more of a database associated with the hardware, a sensor associated with the hardware, or at least one other transmission at least one signaling parameter associated with a condition affecting the broadcast, and determining a minimum signal strength corresponding with the area based at least in part on the at least one signaling parameter, including at least one or more of a temperature, an atmospheric condition, a density associated with a medium through which the broadcasts are transmitted, a frequency bandwidth, a frequency, an altitude, or an at least partial obstruction. In addition to the foregoing, other method embodiments are described in the claims, drawings and text that form a part of the present application.

A system for transmitting or receiving optimized broadcasts includes at least one of a means for transmitting a broadcast or a means for receiving a broadcast. The system also includes a means for determining at least one signaling parameter associated with a condition affecting the broadcast. The system also includes a means for adjusting one or more of a signal strength, a frequency, a frequency bandwidth, a receive sensitivity, or a destination for a broadcast. In addition to the foregoing, other system embodiments are described in the claims, drawings and text that form a part of the present application.

The foregoing summary is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

Embodiments of the present invention are described in detail below with reference to the following drawings.

DETAILED DESCRIPTION

Figure 1:
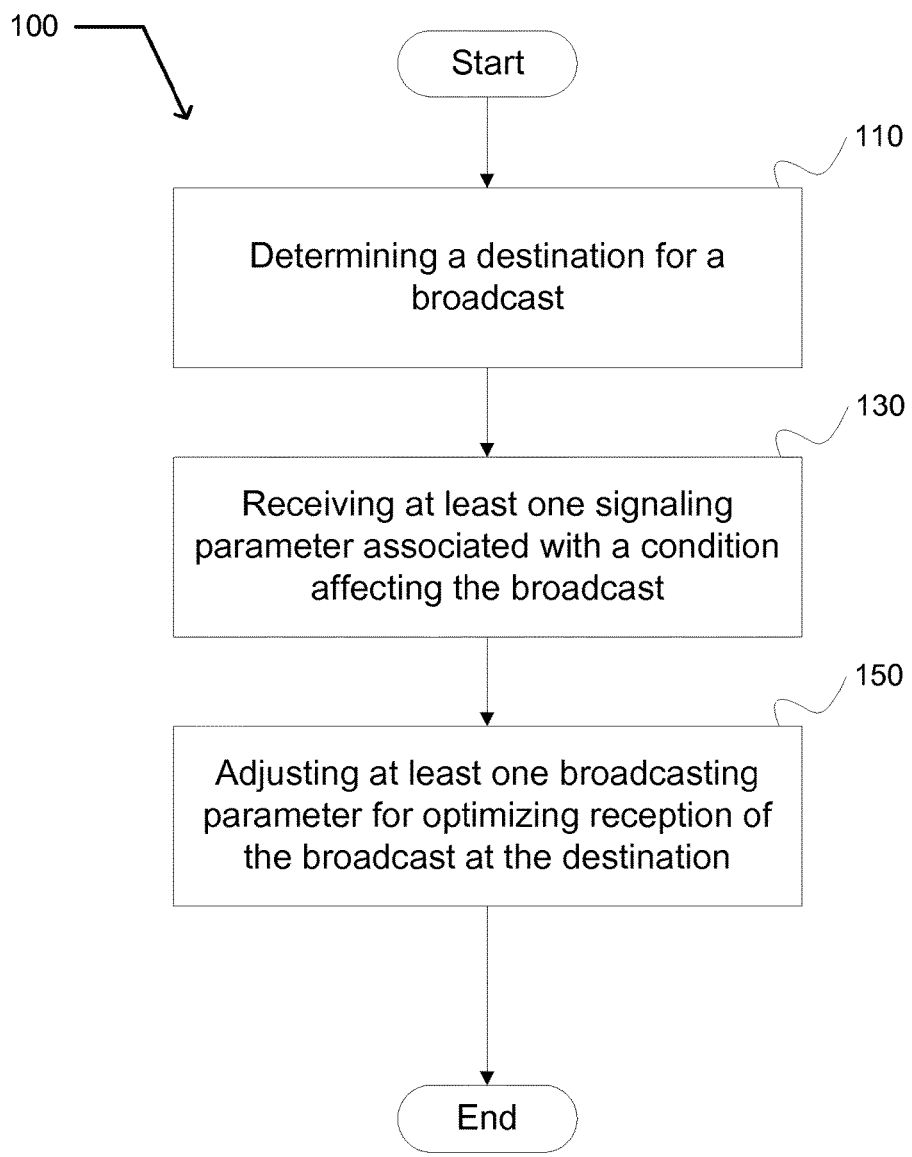
FIG. 1 illustrates an example of an operational flow, in accordance with an embodiment of the invention.

This invention relates generally to broadcasts, and more specifically, to systems and methods for optimizing broadcasts. Specific details of certain embodiments of the invention are set forth in the following description and FIGS. 1-8b to provide a thorough understanding of such embodiments. The present invention may have additional embodiments, may be practiced without one or more of the details described for any particular described embodiment, or may have any detail described for one particular embodiment practiced with any other detail described for another embodiment.

Vehicles may be equipped with communication radios. Airplanes have VHF communications transceivers, such as the King KX-155, used for pilots to communicate with air traffic controllers, other aircraft, or stations on the ground. Police cars, ambulances, fire trucks and other emergency vehicles may have Motorola radios used for officers and emergency workers to communicate with their base or with occupants of other vehicles. Truckers may use a Citizens Band (C.B.) radio to communicate with other truckers and with truck stops. A vehicle equipped with a communication radio may even include an individual in a car with a cellular telephone. Watercraft, including ships and submarines, may have radio equipment. A communication radio may even be used outside of a vehicle, by a police patrolman on foot, or by a walker or stationary individual talking on a cellular phone.

A radio may be used to broadcast signals for other than verbal communications. For example, an aircraft navigational radio may receive signals sent from a ground station including signals providing navigational information, where the signals do not contain words and are not ordinarily decipherable by a human as language. Mobile devices may include Wi-Fi (IEEE 802.11, for example) radios which transmit packetized bit data usable for computing or other purposes. Ground stations may similarly transmit signals with data contained in modulated or otherwise encoded transmissions. A smartphone may receive cellular packet data using technologies such as 3G or LTE.

Vehicles may be further equipped with GPS receivers. A GPS receiver can pinpoint a location in terms of latitude, longitude, altitude, and/or other measures of location. GPS receivers provide location information for aircraft, passenger cars, police and other public safety vehicles, etc. Handheld GPS receivers may be used by walkers to establish location. Some vehicles may have other sources of location information. An aircraft, for example, may have an altimeter in addition to a GPS receiver. Cellular phones may have integrated GPS receivers.

A GPS receiver is often combined with a geographical database to provide navigation information, topographical features, data about geographic landmarks and other such data. For example, a car equipped with a GPS receiver and geographical database can utilize the equipment to provide driving directions to a driver. The same equipment can provide information about landmarks or facilities to the driver, such as the location of a nearby ATM. In an aircraft, the GPS receiver and geographical database can provide a safe navigational route by air for an airplane to safely arrive at an airport without having inadvertently flown into nearby terrain. When flying an instrument approach, a pilot can utilize the GPS receiver and geographical database to be aware of the distance and bearing to the airport while maintaining an awareness of surrounding mountains, buildings or other geographical features from which the aircraft must maintain a safe distance. Drivers may use a GPS with geographical database in the automobile for driving directions to a particular destination. A walker may use a smartphone with a GPS and geographical database for walking directions to a particular destination. Some GPS systems can make use of the Wide Area Augmentation System (WAAS) to provide a more precise location.

Vehicles may further be equipped with receivers configured to receive information about weather. Aircraft may have a radio receiver capable of receiving current weather information transmitted by satellite by operators such as XM. Ground-based weather receivers are available, as are portable receivers that could be carried by a walker. Temperatures can also be sensed by a thermometer installed in a vehicle.

Operators of communication radios, whether the radio is in a vehicle or carried by a walker, may have issues of signal strength to manage. The "strength" of a radio transmission, or the power with which that radio transmission is transmitted, dictates in part how far away that transmission may be heard by a radio receiver. For example, a 10 Watt radio may transmit radio signals farther than an aircraft equipped with a 5 Watt radio. Radio signals are typically transmitted with fixed strengths for all transmissions, irrespective of the distance over which the transmission is intended to be carried.

Accordingly, a ground-based operator at Point A who wishes to transmit a signal intended to be received by another ground-based operator at Point B will likely transmit a signal that is stronger than necessary. In some instances, the signal generated by the ground-based operator at Point A will be transmitted and be able to be received much further away than the ground-based operator at Point B.

The distance over which a transmission may be heard is also impacted by topographical features, among other things. Many radio signals are "line of sight," meaning that if there is a mountain in between Point A and Point B, the signal from Point A may not be able to be received at Point B. If either transmitter A or receiver B is sufficiently elevated, however, over the top of the topographical feature, the radio transmission of Point A may be within the line of sight of Point B such that it may be heard at Point B.

Other aspects which impact reception of a radio signal include interference from other facilities. It may be, for example, that if a low-power radio signal is being broadcast from Point A, which is adjacent to a commercial radio station transmitting at a frequency range close to that of the signal from Point A, the radio signal from Point A is degraded due to interference from the commercial radio station such that Point A's signal may not be received at Point B. Interference may also be in the form of atmospheric conditions, as will be discussed infra, or in the form of solar or magnetic interference. Such interference may be predicted or detected and information about the interference may be relayed to the radio so that adjustments accounting for the interference may be made. The interference may also be detected by the radio station in order to adjust accordingly.

Atmospheric conditions, including cloud cover and/or ambient air temperature may also impact transmission and reception of radio signals. The density of the transmission medium through which the signal is being broadcast may affect transmission and reception of radio signals. This may be in part due to an atmospheric condition or a partial obstruction. The conditions of the transmission medium may vary in between the source and destination of the broadcast. Consider, for example, a transmission from a submarine 500 feet below sea level to a satellite in orbit, in which the transmission medium includes water for a portion of the transmission distance, as well as air, all having varying ambient temperatures and densities. These conditions may be sensed using sensors, referenced using databases local or remote to the transmitter or receiver, predicted using computational methods, or received in near real-time from other sources of information regarding the conditions.

In some instances, where many radio users transmit on the same frequency, there can be competition for the frequency. In the example of aircraft landing at a particular airport, the airport will be assigned a single radio frequency for all users to utilize. All pilots landing at that airport will use the same frequency to send radio transmissions containing information about their position relative to the airport, and their intention. At a tower-controlled airport, all pilots landing at that airport will use the same frequency to talk an air traffic controller, and the air traffic controller will use that same frequency to talk to the pilots.

A rule of thumb is for a pilot landing at a particular airport to begin transmitting position and intentions from 8 to 12 miles away from the airport. However, depending on a host of conditions, if that pilot begins transmitting 10 miles away from the airport, that signal can be heard many miles beyond the airport. If the aircraft is low to the ground, the signal may only be heard within a 15 mile radius including the airport. However, if the aircraft is higher, the signal may carry 80 miles or more.

In some instances, a particular radio frequency is assigned for use at multiple airports. Two, three and even more airports within close range geographically can all be assigned the same radio frequency. There are a limited number of radio frequencies which may be assigned, and there are more airports than there are available frequencies. Therefore it is necessary to reuse frequency assignments. Consequently, three airports within 100 miles of one another, for example airports F, G and H, may all have the same frequency assigned. Pilots intending to land at airport F and transmitting their intentions while 10 miles away may transmit a signal that can be heard by pilots in the vicinity of airports G and H. This is inconvenient for pilots in the vicinity of airports G and H. Since only one pilot may transmit and be understandably received by other pilots at a time, if a pilot at airport F is transmitting, a pilot at airport G may be blocked from sending a transmission.

Radios incorporate a squelch, or selectivity, feature. With a squelch control, a threshold is established for permitting a transmission to be heard by the user. The squelch can be adjusted to let only the strongest signals to be heard by the user, or to permit all signals including very weak signals to be heard. The squelch is a filter, such that only transmissions above the signal strength established by the squelch control are heard over the radio's speaker. If a user intends to hear signals from far away, the signals from far away most likely being the weakest signals, the user can "lower the squelch" so that the filtering is reduced and signals from far away are heard over the speaker. If a user only wants to hear stronger signals that are likely close by, the user may raise the squelch so that only those strong signals are heard over the speaker.

However, operating the squelch to filter out distant transmissions while still permitting closer transmissions to be heard is imprecise. It is a manual process, and it requires the operator to be listening to a distant signal while adjusting the squelch until that distant signal is filtered out. That requires the distant signal to be transmitted at the time the squelch is being adjusted, which is beyond the control of the receiver. Further, as the pilot gets closer to an airport, the radio operator may desire further squelch adjustment to change the selectivity, accounting for the change in position relative to the airport.

This is also an imprecise method of filtering out transmissions which may or may not be pertinent to a particular listener. Many factors other than distance impact signal strength. While it is true that a squelch control that filters out lower signal strength transmissions may block signals that originate further away in terms of latitude and longitude, it is possible that pilots at a higher altitude who transmit may generate a signal of a higher signal strength which overcomes the squelch.

Differently, police officers in city J may share a frequency with police officers in city K, where cities J and K are 50 miles apart and transmissions from officers in city J are not desired to be heard in city K. All of the radios in the patrol cars of city K have their squelch control adjusted such that transmissions from city J are filtered out, the transmissions from city J being lower quality signal strength transmissions by the time they are received in city K. However, city J includes a 7000' mountain, and patrol cars occasionally are dispatched to the top of the mountain. When a patrolman in a car on top of the mountain in city J transmits, that transmission is of a higher quality signal strength by the time it is received in city K, and it is not filtered by the squelch setting of the radios in city K's cars.

In a different example, cellular telephones transmit and receive in communication with a cellular tower. When close to a particular tower, a cellular telephone when transmitting a signal to a cellular tower may broadcast a signal that is stronger than needed. The telephone may unnecessarily transmit a signal that may be able to be received by more distant towers even when there is a tower in the more immediate vicinity. Transmitting such a strong signal may utilize unnecessary power, where a weaker broadcast adequate to communicate with the adjacent cellular tower would suffice. In a cellular telephone, which is battery powered, such unnecessarily strong broadcasts might result in excess drain on the phone's battery, where a reduction in transmission power to a power still sufficient to reach the nearby tower might result in an overall reduction in use of battery power.

Similarly, a Wi-Fi radio installed in a laptop computer which is in communication with an access point may broadcast a signal at a higher power than is needed when the access point is nearby. The Wi-Fi radio in the laptop located near an access point could transmit at a lower power if it was aware of the location and distance to the nearby access point.

Such a lower power transmission could conserve battery life of the laptop. Alternatively, the Wi-Fi network may select the access point for communications with a mobile device in accordance with the location, distance or by reference to other transmission conditions disclosed elsewhere herein.

Given the plethora of location, geography, weather, atmospheric, obstruction and other information now available within close proximity to or internal to radio communication equipment, such information could be provided to and/or integrated with radio communication equipment to optimize radio transmission and reception taking into account location, topography, landmarks and other geographic features, and/or atmospheric and temperature conditions.

An airplane with a communications radio could integrate location from a GPS receiver with the communications radio. The airplane with the communications radio could further have integrated weather from a satellite weather receiver, temperature from an installed thermometer, and/or topographic or landmark information from a navigation database. Integrating the reception of information about location, atmospheric conditions, and topographic/landmark information would facilitate the determination of an optimal transmission power or optimal selectivity or squelch setting for reception. A cellular smartphone with a GPS receiver and a mapping database for providing navigation could be easily provisioned with the location of cellular towers. Similar integration could be performed with vehicle radios for police cars, trucks or other vehicles and for handheld radios. Also, Wi-Fi radios integrated into a laptop computer with GPS may be able to access a database containing locations of wireless access points to set an appropriate transmit power.

Further, upon a determination that a particular transmission between a source and destination may be overly burdened by unfavorable conditions, an alternate destination may be selected. Such selection may be from the aforementioned onboard location database or from another source.

Given constantly varying conditions, a transmission may be subject to interference and require retrying for the transmission to be completed successfully. In some scenarios, a particular number of retries may be acceptable. In some scenarios, a power level can be boosted to lessen the likely number of retries necessary.

Multicast technologies may include a source broadcasting a transmission that is intended to be received at multiple locations. In some scenarios, conditions affecting the broadcast as disclosed above may vary dependent upon conditions between the transmitter and the various reception locations. A multicast transmission may be segmented and operationally varied according to the segments using techniques disclosed herein. In a simple, non-limiting example, a broadcaster may transmit a signal directed to the east at one power and to the west at a different power. The broadcaster may vary the frequency bandwidth, sending a narrower broadcast to the east and a wider broadcast to the west (wherein narrower implies a smaller portion of the frequency spectrum and wider implies a greater portion, whether contiguous or non-contiguous, of the frequency spectrum).

Altering the choice of frequency spectrum over which the signal is broadcast may also affect the quality of the transmission within the meaning of the instant application. Even in a unicast environment, where the signal is intended for a single destination, the broadcaster may vary the frequency bandwidth as dictated by conditions, sending a narrower broadcast or a wider broadcast (wherein narrower implies a smaller portion of the frequency spectrum and wider implies a greater portion, whether contiguous or non-contiguous, of the frequency spectrum). The broadcaster may use different signal strengths, frequencies, or bandwidths (contiguous or non-contiguous) for different transmissions to the same or different recipients, dependent on conditions relating to the broadcast determined in real-time or near real-time.

A broadcaster may choose an alternate transmission medium or station, depending on conditions, including a different transmitter. For example, a cellular network operator with multiple cell sites in its network may determine a particular cell site for completing a transmission to a particular cellular phone based upon conditions detected in real-time or near real-time. A cellular system may detect that a subscriber is within 1000 meters of cellular tower A as a straight-line distance, and within 1500 meters of cellular tower B as a straight-line distance, and choose to complete the transmission via cellular tower B due to a detected or known interference condition associated with the path between the subscriber and cellular tower A. Or, a broadcaster could select a fiber optic connection for 90% of the transmission length and a wireless connection for the remaining 10% in one scenario where wireless interference was heavy, but reverse these percentages in operations where wireless availability is good.

A "radio" as used herein refers without limitation to a device capable of transmitting or receiving, including without limitation a VHF radio, an AM or FM radio, a shortwave radio, a medium wave radio, a cellular phone, a smartphone, a pager, a walkie-talkie, a handheld radio, a transmitting station, a satellite, a packet radio, a television, a wired device connected by copper, fiber, solid conductor, stranded conductor or other non-wireless medium, a Wi-Fi or 802.11 radio, a spread-spectrum radio, a frequency hopping radio, a direct sequence radio, a radio which sends and/or receives electromagnetic waves, and/or a device which sends and/or receives optical signals. A "radio" may include a single or multiple transmitters and/or receivers. Within the meaning of the instant application, a "radio" is a device communicating voice, data or other signals operating by electromagnetic radiation which systematically changes and/or modulates some property of the radiated waves, such as their amplitude, frequency, phase, or pulse width, wherein the transmission medium may be air or a conductor such as a wire, antenna or other signal-bearing medium.

FIG. 1 illustrates an example of an operational flow associated with optimizing broadcasts. FIG. 1 and several following figures may include various examples of operations flows, discussions and explanations with respect to the above-described embodiments. However, it should be understood that the operational flows may be executed in a number of other environments and contexts, and/or in modified versions of FIG. 1. Also, although the various operational flows are illustrated in a sequence(s), it should be understood that the various operations may be performed in other orders than those which are illustrated, and/or may be performed concurrently.

After a start operation, the operational flow 100 includes a determining operation 110. The determining operation determines a destination for a broadcast. The destination for a broadcast may be a particular cellular tower with which a cellular telephone will communicate. Alternatively, a destination for a broadcast may be a particular geographic location. Importantly, a destination for a broadcast does not necessarily require that there be a receiver or reception equipment associated with the destination. A transmitter could be broadcasting with the intention that any reception equipment at the destination be able to receive the broadcast. In some embodiments, determining a destination for a broadcast may include receiving the name of a destination airport, a cellular system, an SSID for a wireless network, a geographic location such as a city, a particular frequency or another entity associated with a destination which may be desired for a transmission.

The operational flow 100 also includes a receiving operation 130. The receiving operation receives at least one signaling parameter associated with a condition affecting the broadcast. A signaling parameter may include an indication of one or more particular conditions that may impact transmission of the broadcast and/or reception of the broadcast at a particular destination, the conditions being described elsewhere herein. Receiving the signaling parameter may refer to a sensor which is integrated with the radio or operatively coupled with the radio sensing the condition in real-time or near real-time. In a simple, non-limiting example, the radio may have an integrated temperature sensor, so a current ambient air temperature at the radio may be sensed. The radio may also or alternatively have a Global Positioning System (GPS) receiver integrated with the radio, or another device capable of providing a geographic location or other reference location of the radio relative to some geographical feature, including LORAN, GLONASS, inertial navigation, etc. Receiving the signaling parameter may also refer to a lookup in a database which is integrated with the radio or operatively coupled with the radio in real-time or near real-time. Receiving the signaling parameter may include receiving the signaling parameter via a transmission medium, such as a weather broadcast via an XM satellite radio broadcast which includes a temperature at the transmitter and/or the receiver. Receiving the signaling parameter may include detecting the signaling parameter from a previous transmission by the same radio or another radio. For example, a signal strength of an incoming transmission from a known transmitter at a known point at a known transmit power may be used to estimate other conditions related to the transmission. Receiving the signaling parameter may include a database lookup. For example, a sunrise or sunset time for a particular latitude and longitude may be retrieved from a database, whether the database is internal to the radio, operatively coupled with the radio or remotely located with respect to the radio.

The operational flow also includes an adjusting operation 150. The adjusting operation includes adjusting at least one broadcasting parameter for optimizing reception of the broadcast at the destination. For example, a signal strength for a transmission may be set in light of the distance for the transmission, where the distance is determined in real-time or near real-time using GPS coordinates from a GPS internal to the radio and geographical coordinates for the destination ascertained through a database lookup. The signal strength may be adjusted so as to broadcast the signal as far as the destination and no further, accounting for conditions such as temperature, obstructions or other factors disclosed elsewhere herein. Alternatively, a frequency, set of frequencies or a frequency bandwidth may be selected according at least in part to the signal parameters.

At least one of the determining operation 110, receiving operation 130 or adjusting operation 150 is at least partially implemented in hardware. The hardware may include a radio transmitter for which a signal strength is selected for a particular transmission according to the adjusting operation 150. The determining operation 110 may include a destination for a broadcast may include, for example, a user inputting a destination through a keypad integrated with the radio or by using a combination of knobs and push-buttons. The receiving operation 130 may include referencing a database to receive a weather report stored recently in the database or a latitude and longitude of a destination for a transmission, where the database is encoded and stored in a non-transitory computer-readable medium internal to the radio. The foregoing examples of aspects of the invention which may be at least partially implemented in hardware are exemplary only and meant to be non-limiting.

Figure 2:
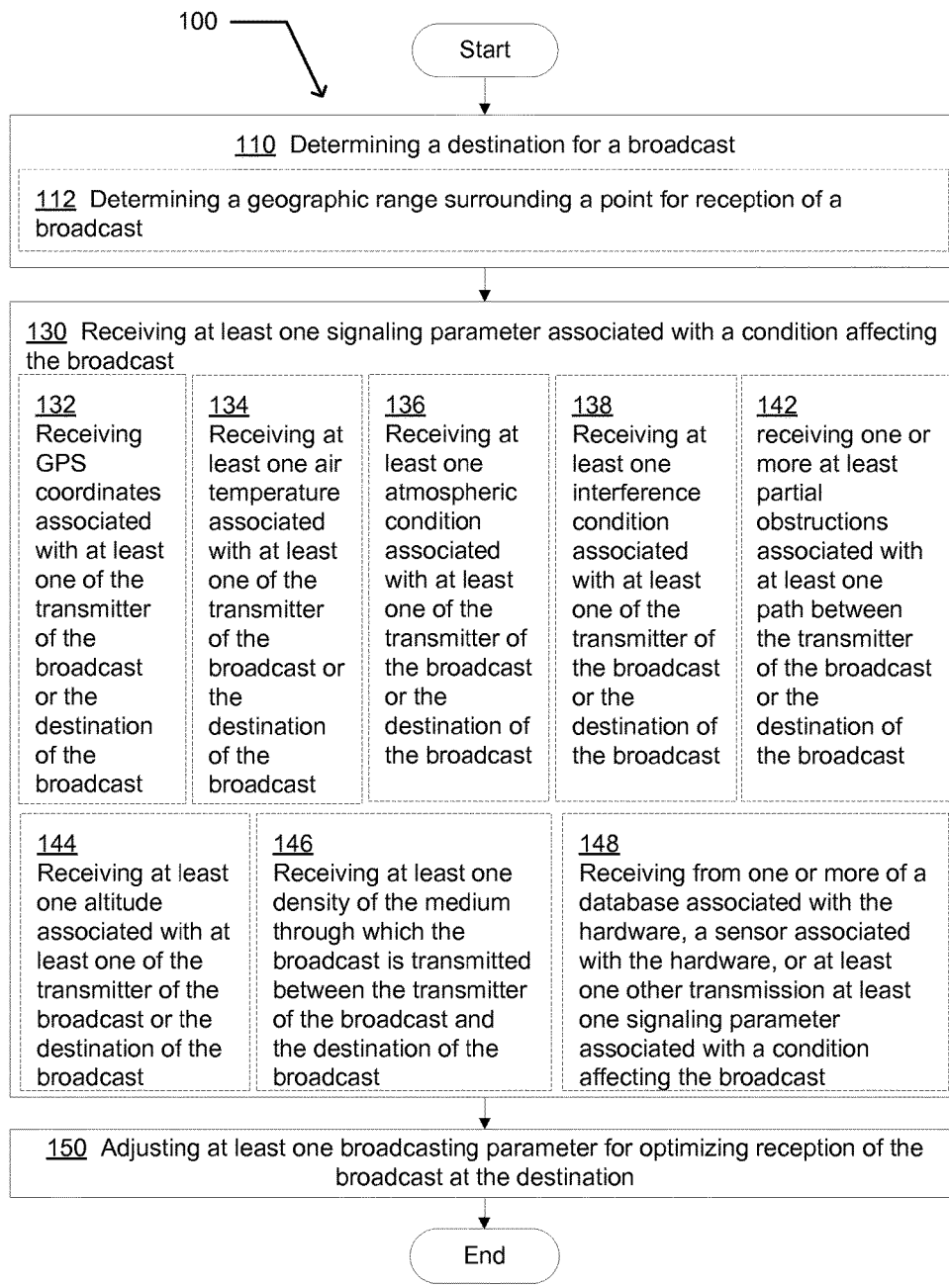
FIG. 2 illustrates an alternative embodiment of the operational flow of FIG. 1.

FIG. 2 illustrates an alternative embodiment of the operational flow 100 of FIG. 1. The operational flow may include one or more of an optional operation 112, an optional operation 132, an optional operation 132, an optional operation 134, an optional operation 136, an optional operation 138, an optional operation 142, an optional operation 144, an optional operation 144, or an optional operation 148, in accordance with various embodiments of the invention.

The optional operation 112 may include determining a geographic range surrounding a point for reception of a broadcast. A destination for a particular transmission may be a particular geographic point, and no further. The destination for a particular transmission may also include a range surrounding a particular geographic point. In some environments, a buffer, or error-correcting or "fudge factor" may be added to the range for the transmission, such that the transmission propagates a distance beyond the destination point. The "fudge factor" may be provided to account for inaccuracies in sensing the parameter, or to account for a delay in receipt of information (a time-delayed weather report, for example) during which delay conditions may have changed. In different environments, a transmission may be intended for an area surrounding a particular point, where any receiving equipment within that area could receive the transmission. For example, in the example of an aircraft approaching a particular destination airport, a pilot may desire to broadcast his or her intentions upon arriving at that airport to any other aircraft in the vicinity. Accordingly, the desired area for the transmission to be received could be a 12 mile radius ring surrounding the destination airport, which represents the geographic range surrounding a point for reception of the broadcast. If the aircraft's present location is 20 miles from the destination airport and the pilot wishes a broadcast to be heard everywhere within a 12 mile ring, the broadcast may be adjusted so as to transmit 32 miles away (20 miles to the destination airport plus another 12 mile radius).

The optional operation 132 may include receiving GPS coordinates associated with at least one of the transmitter of the broadcast or the destination of the broadcast. The radio may use GPS coordinates for its current location to determine proximity to an obstruction, for example. The GPS coordinates may be combined with a database retrieval, wherein an obstruction database indexed by location is stored in the database. The radio may receive GPS coordinates for a destination, either by retrieving the coordinates from a database or perhaps through reception of the coordinates from a separate transmission. The coordinates for the source and destination may be used to compute a distance, or as previously disclosed may be used for determining another condition related to the transmission such as a depth below sea-level, obstructions in the line-of-sight or a location and/or proximity of an alternate transmitter or receiver. GPS coordinates, as disclosed herein, can be any indication of a point in geographical terms, including latitude and longitude, hours, degrees and minutes, GLONASS coordinates, a radius and a vector, absolute or relative references, etc.

The optional operation 134 includes receiving at least one air temperature associated with at least one of the transmitter of the broadcast or the destination of the broadcast. An air temperature may be an ambient air temperature. It may be a measured or a predicted air temperature. It may be real-time, near real-time or previously recorded temperature. The temperature may refer to a point at or near the transmitter, at or near the destination, or any point in between. The temperature may be Fahrenheit, Celsius, Kelvin or any other means of expressing a temperature.

The optional operation 136 includes receiving at least one atmospheric condition associated with at least one of the transmitter of the broadcast or the destination of the broadcast. An atmospheric condition may include a temperature, a barometric pressure, a wind condition, a height of a cloud layer, a thickness of a cloud layer, the number and type of a plurality of cloud layers, a solar condition, a precipitation condition, an electrical charge condition, a lightning condition, a sun, moon or other celestial body position relative to the transmitter (wherein the transmitter may be earth-based, in orbit, or in space), sunspots, solar flares, etc. The atmospheric condition may be detected using a sensor integrated with or operably coupled with the radio, or may be received by the radio, or may be read from a database integrated with or operably connected with the radio. The condition may be a present condition, a past condition, a future condition or a predicted condition.

The optional operation 138 includes receiving at least one interference condition associated with at least one of the transmitter of the broadcast or the destination of the broadcast. An interference condition may be detected using a sensor integrated with or operably connected to the radio, or information about the interference condition may be received by the radio in a separate transmission, or information about the interference condition may be inferred from a separate transmission, or the interference condition may be found through a database lookup using a database integrated with the radio or located remotely from the radio. An interference condition may be one or more of a magnetic condition, a crosstalk condition, another transmitter on the same frequency, a transmitter on an adjacent or nearby frequency with sufficient bandwidth to encroach on the frequency, a different transmitter at a higher power, an inadequate shielding condition, etc.

The optional operation 142 includes receiving one or more at least partial obstructions associated with at least one path between the transmitter of the broadcast or the destination of the broadcast. An obstruction may be detected by the radio, by a sensor integrated with or operably connected to the radio, or by a remote system which provides the obstruction information to the radio. An obstruction may be found by searching a database integrated with the radio or remotely located from the radio about possible obstructions nearby. An obstruction may be a permanent obstruction, such as a mountain reaching a particular altitude or an office building on the street along which a cellular phone user is walking. Or, an obstruction may be a temporary. For example, a handheld mobile device with an integrated Wi-Fi radio being used in a warehouse may have temporary obstruction conditions as inventory is moved in and out of the warehouse. By accessing a database, the radio can be aware of a warehouse full of inventory and obstructions between the radio and an access point, or the radio can be aware of a warehouse that is empty having relatively few obstructions between the radio and the access point. An obstruction may include a number of interior and/or exterior walls in a building. For example, a mobile device with access to a database regarding the floor plan for all floors of a building and the location of all access points in the building can know how many walls and/or floors the transmission must pass through to reach the access point. A smartphone with a similar database containing all floor plan information of all buildings in a city may know how many walls, floors, buildings or other obstructions lie between the smartphone and the cellular tower.

The optional operation 144 includes receiving at least one altitude associated with at least one of the transmitter of the broadcast or the destination of the broadcast. An altitude may be received from GPS coordinates, either from an integrated GPS, Loran, GLONASS, altimeter, or other altitude-providing system integrated into or operably connected with the radio. Altitude information about either the transmitter or the destination for the transmission may be received from a remote source, or through a database lookup. Altitude information combined with obstruction information may provide information regarding the required signal to clear an obstruction as opposed to trying to broadcast through the obstruction or by reflection.

The optional operation 146 includes receiving at least one density of the medium through which the broadcast is transmitted between the transmitter of the broadcast and the destination of the broadcast. The medium may be air in the case of a wireless radio. The medium could also be air and water, as in the case of a submarine transmitting to a satellite. The density of the air may vary at different altitudes. Density may also refer to the density of the content of obstructions. A warehouse full of kitty litter provides much higher density obstructions than a warehouse full of bubble-wrap. Density may be assessed by any sensor integrated with or operatively coupled to the radio, including at least a transmissometer or other device for measuring transmissivity. Density may be obtained by searching a database, for examining the content of obstructions in the warehouse in the form of the type of inventory, for example. Density may also be included in information received from another transmission, or computed based on location information and a projected path of a transmission, including at least one or more projected reflective paths of a transmission. Density may refer to the ability of a non-wireless medium to carry the signal, for example a capacitance, inductance or resistance of a metal conductor, or the optical loss associated with an optical medium such as fiber optic cable. Density may be assessed with a time-domain reflectometer, or information about breaks in a physical media may be received from a database or through a transmission. In some embodiments, density may be defined as, equivalent to or proportional to transmission capacity.

The optional operation 148 includes receiving from one or more of a database associated with the hardware, a sensor associated with the hardware, or at least one other transmission at least one signaling parameter associated with a condition affecting the broadcast. In some embodiments, signaling parameters may be received from sensors either integrated with or operationally connected to the radio. The signaling parameters may be received from a remote sensor via a separate transmission or via a physical connection. The parameters may represent a real-time measurement of a signaling parameter, a near real-time measurement, a past measurement or a prediction of a future value of the signaling parameter. The parameter may be a result of a database search, including searching a database encoded in hardware contained by the radio or operatively coupled with the radio. The database may contain statistical, geographical, topographical or historical information, or any other type of data useful for ascertaining a signaling parameter. Signaling parameters may be estimated using a value derived or measured from a previous or current transmission.

Figure 3:
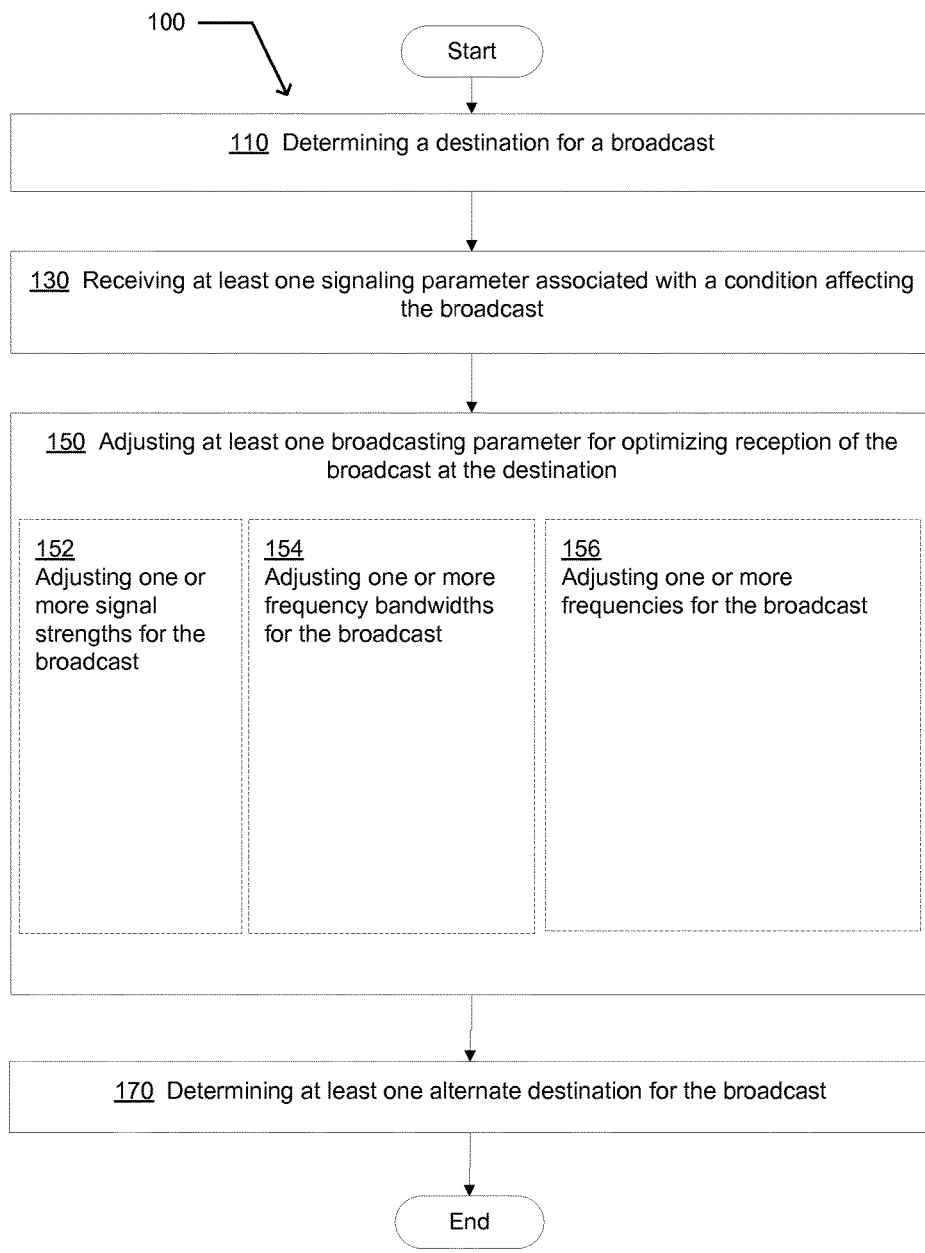
FIG. 3 illustrates another alternative embodiment of the operational flow of FIG. 1.

FIG. 3 illustrates an alternative embodiment of the operational flow 100 of FIG. 1. The operational flow may include one or more of an optional operation 152, an optional operation 154, or an optional operation 156, in accordance with various embodiments of the invention. The operational flow 100 may further include optional operation 170, in accordance with a different embodiment of the invention.

The optional operation 152 includes adjusting one or more signal strengths for the broadcast. A particular power for a transmission may be selected which results in a certain signal strength, the signal strength intended to provide adequate reception of the transmission at a destination or range surrounding the destination. For transmissions which involve broadcasting on different frequencies, different power settings and/or signal strengths may be selected or obtained. Transmit power or signal strength may result from radio characteristics such as a wattage, voltage, current, a type of antenna, radiation, reflectance, resistance, capacitance, inductance, conductance, attenuation, or from a directional antenna direction, and may be provided in measurements of decibel microvolts per meter or milliwatts.

The optional operation 154 includes adjusting one or more frequency bandwidths for the broadcast. A broad selection of bandwidth may be selected to, for example, make up for frequency ranges which are congested or where selection of transmit power does have the desired result. Adjusting one or more frequency bandwidths may include utilizing an additional frequency portion of the spectrum, whether contiguous or non-contiguous.

The optional operation 156 includes adjusting one or more frequencies for the broadcast. A particular frequency may be chosen for a particular destination as assigned by an external entity. For example, selecting a particular destination airport may result in a database lookup which chooses a common traffic advisory frequency (CTAF) for the airport and selects that frequency. In different embodiments, a frequency is chosen for optimization of signal strength, antenna characteristics, to reduce congestion or in light of existing use of a particular frequency or neighboring frequency.

The optional flow 100 may include an optional operation 170, which continues the operational flow by including determining at least one alternate destination for the broadcast. Should the operational flow determine that a transmission to a particular destination would have less optimal characteristics than to an alternate destination, one or more alternate destinations for the transmission may be chosen utilizing the aforementioned methods or other means.

Figure 4:
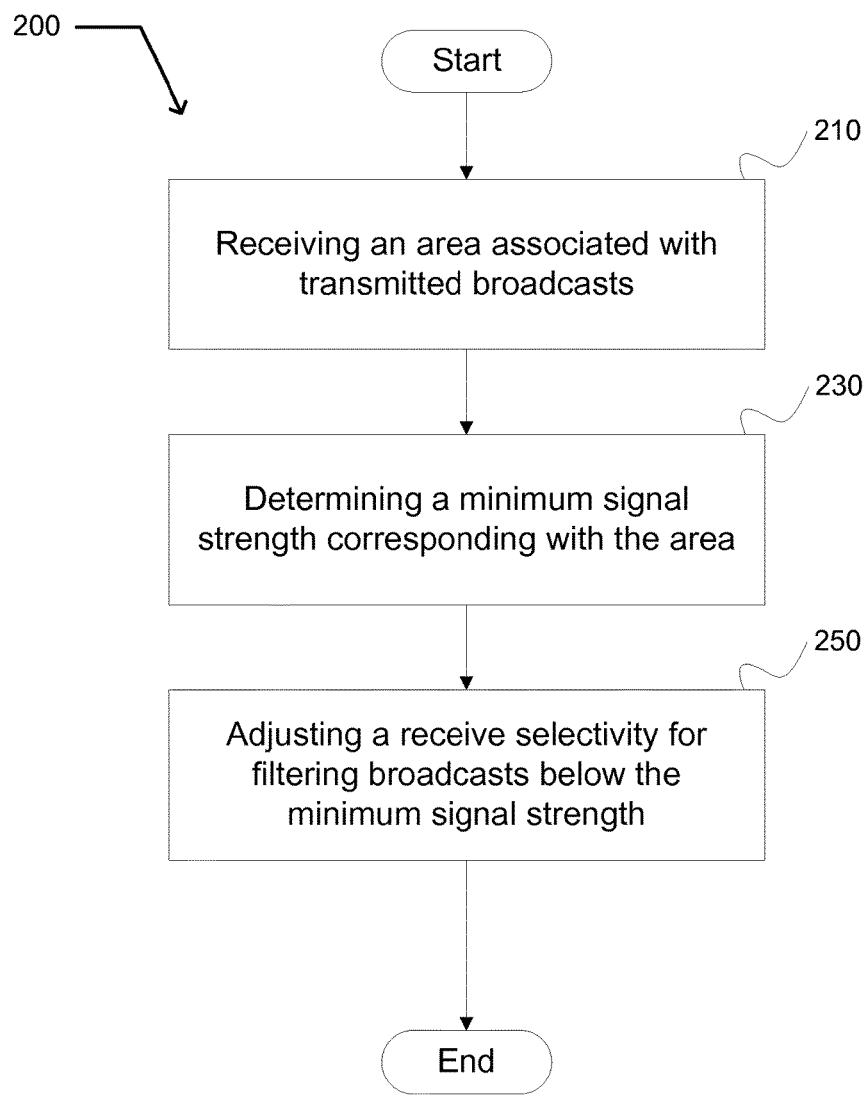
FIG. 4 illustrates an example of an operational flow, in accordance with a alternate embodiment of the invention.

FIG. 4 illustrates an example of an operational flow associated with optimizing broadcasts. FIG. 4 and several following figures may include various examples of operations flows, discussions and explanations with respect to the above-described embodiments. However, it should be understood that the operational flows may be executed in a number of other environments and contexts, and/or in modified versions of FIG. 4. Also, although the various operational flows are illustrated in a sequence(s), it should be understood that the various operations may be performed in other orders than those which are illustrated, and/or may be performed concurrently.

After a start operation, the operational flow 200 includes a receiving operation 210. The receiving operation receives an area associated with transmitted broadcasts. The area associated with transmitted broadcasts may be a range about a particular point of interest to the receiving radio or the operator of the receiving radio. For example, a pilot flying an aircraft to a particular airport who is 15 miles away from that airport may be interested in transmissions originating anywhere between the aircraft and the destination, and within a 12-mile ring of the destination. The pilot may not be interested in receiving transmissions originating from locations outside of that area (from an airport 50 miles behind the aircraft, for example, or from an airport 30 miles beyond the destination airport).

The operational flow 200 also includes a determining operation 230. The determining operation determines a minimum signal strength corresponding with the area. The minimum signal strength may be determined using techniques disclosed elsewhere herein. For example, a pilot navigating to a particular destination airport 15 miles away may only wish to hear signals with a certain signal strength which corresponds to aircraft radios within the 12-mile ring about the destination airport. Taking into consideration frequencies for other airports in the vicinity, distances, temperatures, obstructions, altitudes and other characteristics, the determining operation correlates a particular signal strength given a current position relative to the destination airport which would indicate that a transmission is within the ring.

The operational flow also includes an adjusting operation 250. The adjusting operation includes adjusting a receive selectivity for filtering broadcasts below the minimum signal strength. For example, the adjusting operation may affect a squelch control of an aircraft radio, increasing the squelch (increasing the selectivity) to filter out extraneous and lower signal-strength transmissions as the aircraft gets closer to the destination.

At least one of the receiving operation 210, determining operation 230 or adjusting operation 250 is at least partially implemented in hardware. The hardware may include selectivity circuitry for which filtering transmissions below a particular signal is achieved according to the adjusting operation 250. The receiving operation 210 may include a reference to an area by a user, for example, inputting a destination through a keypad integrated with the radio or by using a combination of knobs and push-buttons. The determining operation 230 may include computing, using one or more microprocessors integrated with the radio, given a range of locations, an assumed signal strength, a distance or other signal parameters associated with transmission conditions, a signal strength below which a signal would be so weak that it is assumed to be outside of the area from which transmissions are desired to be heard. The foregoing examples of aspects of the invention which may be at least partially implemented in hardware are exemplary only and meant to be non-limiting.

Figure 5:
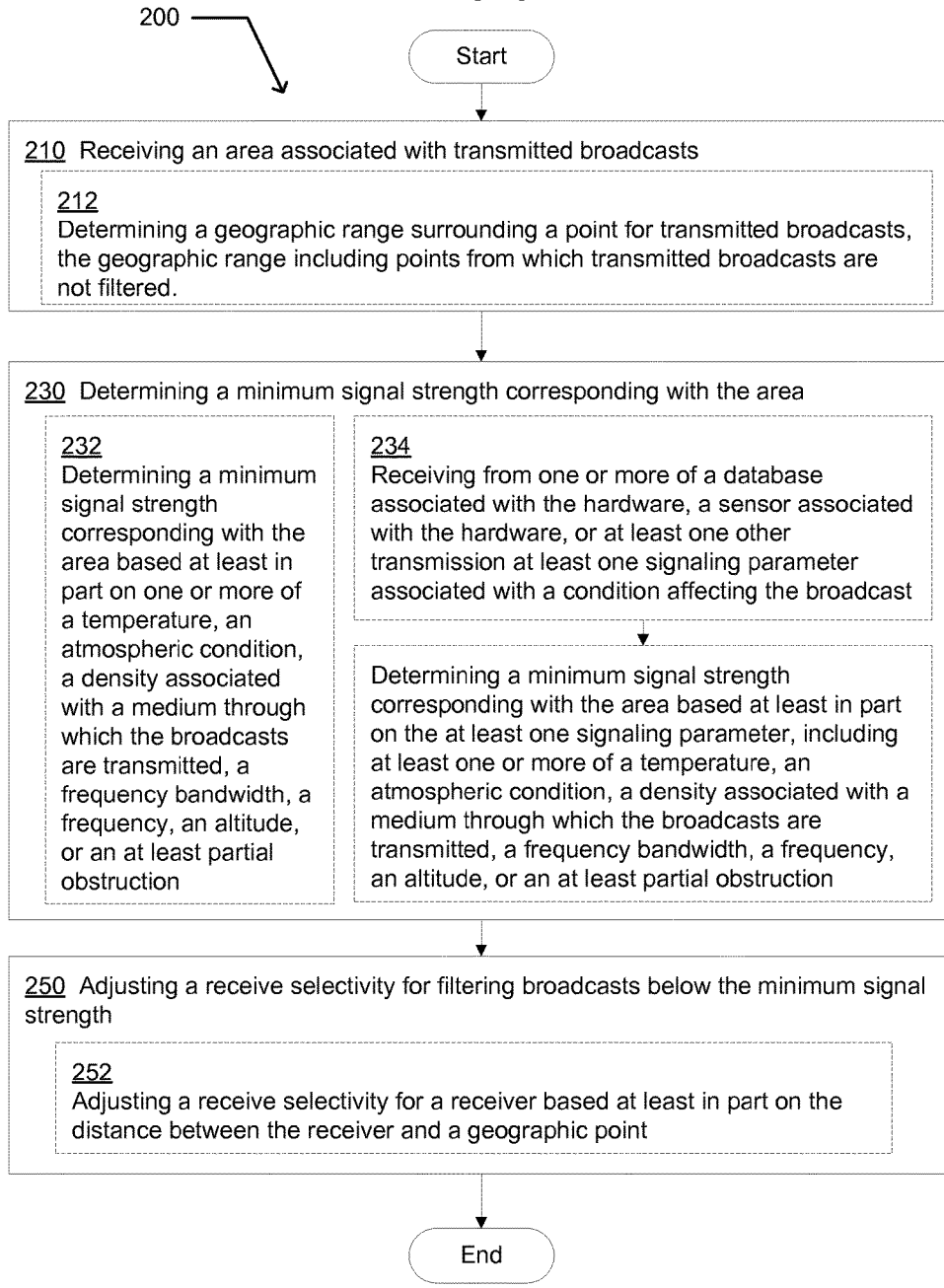
FIG. 5 illustrates another alternative embodiment of the operational flow of FIG. 4.

FIG. 5 illustrates an alternative embodiment of the operational flow 200 of FIG. 4. The operational flow may include one or more of an optional operation 212, an optional operation 232, an optional operation 234, or an optional operation 252, in accordance with various embodiments of the invention.

The optional operation 212 may include determining a geographic range surrounding a point for transmitted broadcasts, the geographic range including points from which transmitted broadcasts are not filtered. In some embodiments, it may be desirable to hear only broadcasts that are estimated to originate from within a 4-mile ring of a certain point. In different embodiments, it may be desirable to hear broadcasts that originate from within a 30 radius of a certain point. In some embodiments, the determination of the geographic range may not be measured by a radius about a certain point, but rather by a set of geographic coordinates bounding an area in 3 dimensions, where transmissions originating from within the bounded area are desirable and others are not.

The optional operation 232 may include determining a minimum signal strength corresponding with the area based at least in part on one or more of a temperature, an atmospheric condition, a density associated with a medium through which the broadcasts are transmitted, a frequency bandwidth, a frequency, an altitude, or an at least partial obstruction. In some embodiments, a broadcast received with a lower signal strength may sneak through a desired selectivity setting because overcast conditions permit the weaker signal to be reflected from low clouds. Or, an ambient air temperature may permit a signal to travel farther than normal, so the selectivity would be automatically increased to raise the threshold and permitting only transmissions with strong signal strength correlated with close-in transmission to be heard.

The optional operation 234 may include receiving from one or more of a database associated with the hardware, a sensor associated with the hardware, or at least one other transmission at least one signaling parameter associated with a condition affecting the broadcast; and determining a minimum signal strength corresponding with the area based at least in part on the at least one signaling parameter, including at least one or more of a temperature, an atmospheric condition, a density associated with a medium through which the broadcasts are transmitted, a frequency bandwidth, a frequency, an altitude, or an at least partial obstruction. A search of an obstruction database, for example, may reveal that a line of sight between an aircraft and a destination airport of interest may be clear from a certain point, but obstructed from a different point. In such circumstances the operational flow may alter the threshold signal strength to filter out additional broadcasts that are not correlated with a location within the desired range. A lightning detector may alternatively detect that lightning is disrupting transmissions and altering the signal strength of received transmissions, requiring a lowering of the selectivity to permit desired transmissions to be received.

The optional operation 252 may include adjusting a receive selectivity for a receiver based at least in part on the distance between the receiver and a geographic point. A pilot may only desire to hear transmissions no further than within a ring about a destination airport. As the pilot gets closer to the destination airport, the operational flow increases the receive selectivity to account for the increased signal strength of broadcasts originating closer to the aircraft. The goal is to adjust the selectivity to keep the radius within which broadcasts that are transmitted may be received constant as the aircraft gets closer to the airport.

Figure 6:
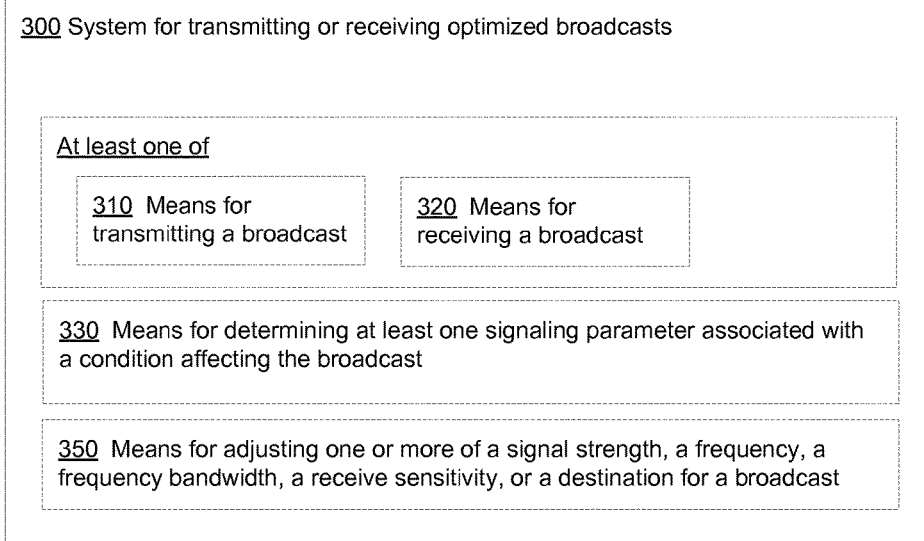
FIG. 6 illustrates an example system, in accordance with an embodiment of the invention.

FIG. 6 illustrates a system 300 for transmitting or receiving optimized broadcasts. The system includes at least one of means for transmitting 310 or means for receiving 320. The system also includes means for determining 330. The system also includes means for adjusting 350. Other system components may be included in various embodiments of system 300 consistent with the spirit of this disclosure, including a variety of sensors, transceivers, databases and/or data stores, etc.

System 300 includes at least one of means 310 for transmitting a broadcast or means 320 for receiving a broadcast.

System 300 includes means 330 for determining at least one signaling parameter associated with a condition affecting the broadcast.

System 300 includes means 350 for adjusting one or more of a signal strength, a frequency, a frequency bandwidth, a receive sensitivity, or a destination for a broadcast.

Figure 7A:
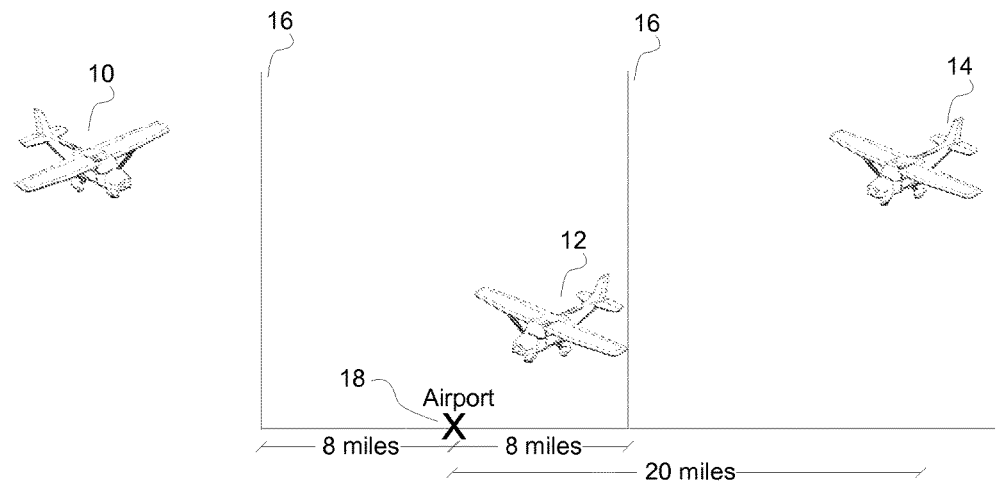
FIGS. 7a and 7b depict an exemplary environment in which an embodiment of the invention may be implemented.
Figure 7B:
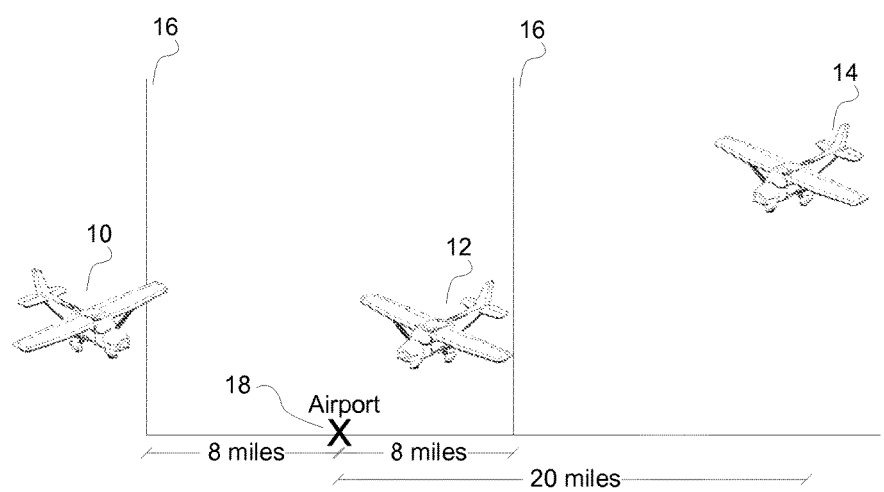

FIGS. 7a and 7b depict an exemplary environment in which an embodiment of the invention may be implemented. In an exemplary embodiment, the operational flows described herein may be embodied at least in part in a radio installed in an aircraft, such as exemplary aircraft 10 approaching an airport 18. Also near airport 18 is a second aircraft 12. The existence of aircraft 12 is of interest to the pilot of aircraft 10, since aircraft 12 is within 8 miles of the airport to which aircraft 10 is going. Also depicted is aircraft 14. Aircraft 14 is at least 28 miles from aircraft 10 and its existence may be of no interest whatsoever to aircraft 10. However, all of aircraft 10, 12 and 14 may be transmitting on the same radio frequency. In the case of aircraft 14, it may be bound for an airport that is not airport 18, but that different airport may share the same frequency with aircraft 18. It would be desirable for the radio of aircraft 10 to automatically adjust its selectivity (increase its squelch) so as to hear only transmissions from aircraft 12 but not aircraft 14.

In some embodiments, using operational methods described within the instant disclosure, upon a determination of the distance to airport 18 and receiving an area around airport 18 from which the pilot of aircraft 10 would like to hear originating radio broadcasts, the aircraft radio onboard aircraft 10 may select a squelch or selectivity level accordingly. For example, the aircraft radio in aircraft 10 may determine that transmissions from aircraft within an 8 mile radius of airport 18, given the distance between aircraft 10 and airport 18 (and the outer boundary of its 8 mile ring) will have a particular signal strength n. The radio may utilize an onboard GPS to determine the location of the aircraft in which it is installed. The radio may search a database internal to the radio or operably connected to the radio for the location of the airport 18, for the purposes of determining the distance between aircraft 10 and airport 18 and correlating signal strength with distance appropriately. The radio may further adjust the receive sensitivity (the "squelch") so that transmissions below the signal strength threshold of n are not heard by the pilot, but transmissions above the threshold are heard by the pilot.

FIG. 7a shows aircraft 10 relatively far from the 8-mile ring bounded by boundaries 16. An operational method according to the invention would ascertain and use the distance as described above, and dynamically compute and set a receive selectivity so that broadcasts originating from the outside edge of the 8-mile ring are filtered out. FIG. 7b shows aircraft 10 relatively nearer to the 8-mile ring bounded by boundaries 16. The operational method according to the invention would account for the change in location and distance from the airport, update the signal strength corresponding to broadcasts within the 8-mile ring (which would be stronger than in FIG. 7a) and further adjust the receive sensitivity to filter out transmissions. Note in FIG. 7b that aircraft 14 is closer than in FIG. 7b, so the selectivity must be increased to continue to keep its transmissions from being heard. It is intended that the computation of the signal strength correlating to transmissions originating from inside the desired area and corresponding adjustment of the receive selectivity take place continuously, many times a second and more rapidly than a human could possibly achieve such computations in order to provide the optimal correlation of signal strength with receive selectivity.

Figure 8A:
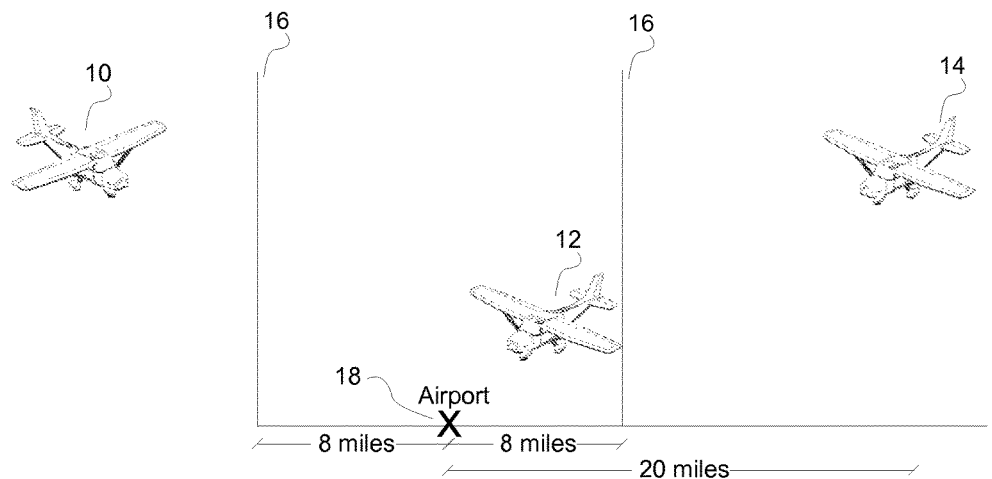
FIGS. 8a and 8b depict an additional exemplary environment in which a different embodiment of the invention may be implemented.
Figure 8B:
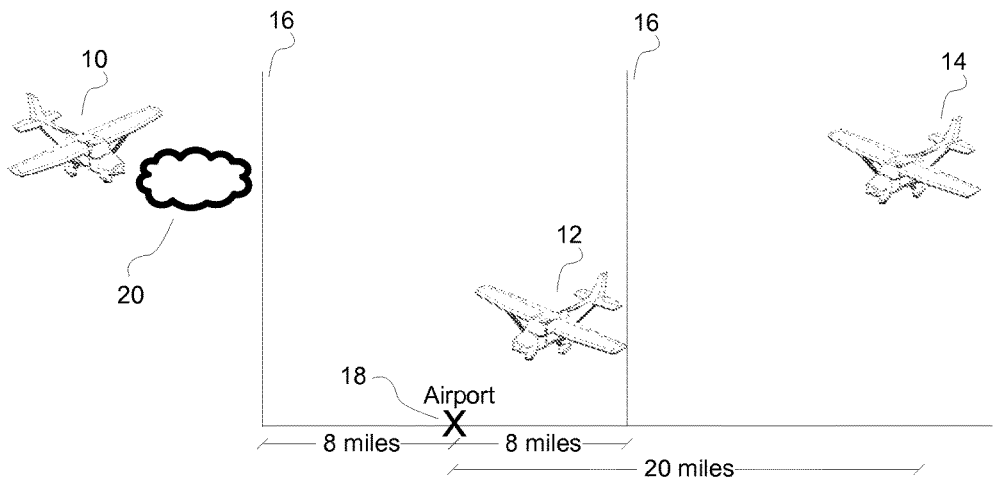

FIGS. 8a and 8b depict an additional exemplary environment in which a different embodiment of the invention may be implemented. The aspects of FIG. 8a are similar to that described for FIG. 7a. However, FIG. 8b depicts a change in weather conditions, where cloud 20 is now between aircraft 10 and aircraft 12 and 14. According to methods described elsewhere herein, the aircraft radio in aircraft 10 may receive real-time or near real-time information about atmospheric and/or temperature conditions, such as the existence of cloud 20. Cloud 20 in the line of sight between aircraft 10 and aircraft 12 means that transmissions by aircraft 12 will have a weaker signal strength when received at aircraft 10. Likewise, transmissions by aircraft 14 will have a weaker signal strength when received at aircraft 10 following penetration through cloud 20, or when a reflected signal from aircraft 14 is received at aircraft 10. Thus, the methods taught herein allow for adjustment of receive selectivity corresponding to a signal strength threshold correlated with a desired area from which transmissions are to be heard. The cloud conditions are sensed or received, the signal strength threshold for transmissions is lowered and the selectivity is adjusted accordingly.

The examples provided in the descriptions corresponding to FIGS. 7a, 7b, 8a and 8b are strictly non-limiting examples. The methods and systems described herein may be implemented with reference to any environment, feature, or embodiment taught, suggested or within the spirit of the instant application. No specific applicability or limitation to aircraft, VHF radio communication, and/or cloud conditions is intended.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An aircraft radio circuitry arrangement of an aircraft radio for reducing effects of Common Traffic Advisory Frequency (CTAF) radio congestion, comprising:
    circuitry configured for receiving at least (i) an indication of an airport, (ii) a geographic range surrounding the airport, (iii) a CTAF frequency associated with the airport, and (iv) an altitude of the airport;
    circuitry configured for determining a first distance between the aircraft radio and the airport;
    circuitry configured for obtaining a first altitude of the aircraft radio;
    circuitry configured for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport; and
    circuitry configured for providing an indication of a second transmit power of the aircraft radio for transmissions by the aircraft radio via the CTAF frequency associated with the airport based at least in part on (a) a determined second distance between the aircraft radio and the airport, (b) the geographic range surrounding the airport, (c) an obtained second altitude of the aircraft radio, and (d) the altitude of the airport,
    wherein the second transmit power of the aircraft radio for transmissions by the aircraft radio via the CTAF frequency associated with the airport is operable to alter, from the first transmit power of the aircraft radio, a distance which transmissions by the aircraft radio via the CTAF frequency associated with the airport will propagate from the aircraft radio towards the geographic range surrounding the airport at least as a function of the determined second distance between the aircraft radio and the airport and as a function of the obtained second altitude of the aircraft radio.

2. The aircraft radio circuitry arrangement of claim 1, wherein circuitry configured for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport comprises:
    circuitry configured for providing an indication of a first transmit power of the aircraft radio for transmissions by the aircraft radio via the CTAF frequency associated with the airport at least partially based on at least one topographic condition related to a line of sight between a location of the aircraft in which the aircraft radio is present and the airport, the at least one topographic condition at least partially obtained via a query of at least one database stored by the aircraft radio.

3. The aircraft radio circuitry arrangement of claim 1, further comprising:
circuitry configured for receiving real-time weather information via at least one input configured for receiving data from a receiver of satellite-based real-time weather information located in the aircraft; and
circuitry configured to determine whether adjustment of transmit power of the aircraft radio for transmissions by the aircraft radio via the CTAF frequency associated with the airport is needed at least partially based on the real-time weather information.

4. The aircraft radio circuitry arrangement of claim 1, further comprising:
circuitry configured for determining a current time at least partially based on GPS data associated with a location of the aircraft radio;
circuitry configured for computing at least one of a sunrise or a sunset time associated with the location of the aircraft radio at least partially based on the GPS data associated with the location of the aircraft radio;
circuitry configured for providing at least one current daylight condition at least partially based on the determined current time and the computed at least one of a sunrise or a sunset time; and
circuitry configured to determine whether adjustment of transmit power of the aircraft radio for transmissions by the aircraft radio via the CTAF frequency associated with the airport is needed at least partially based on the at least one current daylight condition.

5. The aircraft radio circuitry arrangement of claim 1, further comprising:
at least one GPS sensor internal to the aircraft radio.

6. The aircraft radio circuitry arrangement of claim 1, wherein circuitry configured for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport comprises:
circuitry configured for providing an indication of a first transmit power of the aircraft radio for transmissions by the aircraft radio via the CTAF frequency associated with the airport at least partially based on data relating to at least one of a precipitation condition or a cloud cover condition received from a means for obtaining real-time weather information operably coupled with the aircraft radio.

7. The aircraft radio circuitry arrangement of claim 1, wherein circuitry configured for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport comprises:
circuitry configured for providing an indication of a first CTAF frequency transmit power of the aircraft radio for transmissions by the aircraft radio via the CTAF frequency associated with the airport at least partially based on data relating to at least one of a precipitation condition or a cloud cover condition received via at least an airborne weather radar system operably coupled with the aircraft radio, the aircraft radio and airborne weather radar system installed in an aircraft.

8. The aircraft radio circuitry arrangement of claim 1, wherein circuitry configured for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport comprises:
circuitry configured for providing an indication of a first CTAF frequency transmit power of the aircraft radio for transmissions by the aircraft radio via the CTAF frequency associated with the airport at least partially based on at least one daylight condition.

9. The aircraft radio circuitry arrangement of claim 1, wherein circuitry configured for receiving at least (i) an indication of an airport, (ii) a geographic range surrounding the airport, (iii) a CTAF frequency associated with the airport, and (iv) an altitude of the airport comprises:
circuitry configured for receiving, via a user interface of the aircraft radio, at least one of an identifier or a frequency as the indication of an airport.

10. The aircraft radio circuitry arrangement of claim 1, wherein circuitry configured for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport comprises:
circuitry configured for providing an indication of a first CTAF frequency transmit power of the aircraft radio for transmissions by the aircraft radio via the CTAF frequency associated with the airport at least partially based on data relating to at least one of a precipitation condition or a cloud cover condition received via at least an aircraft satellite weather receiver operably coupled with the aircraft radio, the aircraft radio and satellite weather receiver installed in an aircraft.

11. The aircraft radio circuitry arrangement of claim 1, further comprising:
at least one weather receiver operably coupled with the aircraft radio capable of receiving weather information relating to at least one of current weather conditions, recent weather conditions, or forecast weather conditions.

12. The aircraft radio circuitry arrangement of claim 1, wherein circuitry configured for determining a first distance between the aircraft radio and the airport comprises:
circuitry configured for querying at least one database stored by the aircraft radio to receive a geographic location, the geographic location including an altitude, associated with the airport;
circuitry configured for receiving an altitude associated with the aircraft from one or more of at least one GPS sensor or at least one altimeter present in the aircraft; and
circuitry configured for computing the at least one distance at least partially based on the received geographic location including an altitude associated with the airport, GPS data indicative of the location of the aircraft, and the received altitude of the aircraft.

13. A method for an aircraft radio for reducing effects of Common Traffic Advisory Frequency (CTAF) radio congestion, comprising:
  receiving at least (i) an indication of an airport, (ii) a geographic range surrounding the airport, (iii) a CTAF frequency associated with the airport, and (iv) an altitude of the airport;
  determining a first distance between the aircraft radio and the airport;
  obtaining a first altitude of the aircraft radio;
  providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport; and
  providing an indication of a second transmit power of the aircraft radio for transmissions by the aircraft radio via the CTAF frequency associated with the airport based at least in part on (a) a determined second distance between the aircraft radio and the airport, (b) the geographic range surrounding the airport, (c) an obtained second altitude of the aircraft radio, and (d) the altitude of the airport,
  wherein the second transmit power for transmissions by the aircraft radio via the CTAF frequency associated with the airport is operable to alter, from the first transmit power of the aircraft radio, a distance which transmissions by the aircraft radio via the CTAF frequency associated with the airport will propagate from the aircraft radio towards the geographic range surrounding the airport at least as a function of the determined second distance between the aircraft radio and the airport and as a function of the obtained second altitude of the aircraft radio.

14. An aircraft radio arrangement of an aircraft radio for reducing effects of Common Traffic Advisory Frequency (CTAF) radio congestion, comprising:
  means for receiving at least (i) an indication of an airport, (ii) a geographic range surrounding the airport, (iii) a CTAF frequency associated with the airport, and (iv) an altitude of the airport;
  means for determining a first distance between the aircraft radio and the airport;
  means for obtaining a first altitude of the aircraft radio;
  means for providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport; and
  means for providing an indication of a second transmit power of the aircraft radio for transmissions by the aircraft radio via the CTAF frequency associated with the airport based at least in part on (a) a determined second distance between aircraft radio and the airport, (b) the geographic range surrounding the airport, (c) an obtained second altitude of the aircraft radio, and (d) the altitude of the airport,
  wherein the second transmit power of the aircraft radio for transmissions by the aircraft radio via the CTAF frequency associated with the airport is operable to alter, from the first transmit power of the aircraft radio, a distance which transmissions by the aircraft radio via the CTAF frequency associated with the airport will propagate from the aircraft radio towards the geographic range surrounding the airport at least as a function of the determined second distance between the aircraft radio and the airport and as a function of the obtained second altitude of the aircraft radio.

15. The aircraft radio circuitry arrangement of claim 1, wherein circuitry configured for providing an indication of a second transmit power of the aircraft radio for transmissions by the aircraft radio via the CTAF frequency associated with the airport based at least in part on (a) a determined second distance between the aircraft radio and the airport, (b) the geographic range surrounding the airport, (c) an obtained second altitude of the aircraft radio, and (d) the altitude of the airport comprises:
  circuitry configured for determining whether the distance between the aircraft radio and the airport is decreasing and, if the distance between the aircraft radio and the airport is decreasing, providing an indication of a second transmit power that is decreased relative to the first transmit power.

16. The aircraft radio circuitry arrangement of claim 1, wherein circuitry configured for receiving at least (i) an indication of an airport, (ii) a geographic range surrounding the airport, (iii) a CTAF frequency associated with the airport, and (iv) an altitude of the airport comprises:
  circuitry configured for at least one of receiving an indication of a frequency and determining the indication of an airport via at least a search of a database associating frequencies and airports and confirming the indication of the airport at least partially via a user interface of the aircraft radio, or receiving an indication of an airport at least partially via the user interface of the aircraft radio and determining the CTAF frequency via at least a search of a database associating airports and frequencies.

17. The aircraft radio circuitry arrangement of claim 1, wherein circuitry configured for receiving at least (i) an indication of an airport, (ii) a geographic range surrounding the airport, (iii) a CTAF frequency associated with the airport, and (iv) an altitude of the airport comprises:
  circuitry configured for receiving the geographic range surrounding the airport based at least in part on at least one of an entry received via a user interface of the aircraft radio or a database lookup.

18. The aircraft radio circuitry arrangement of claim 1, further comprising:
  at least one non-transitory computer-readable medium including at least some data associating identifiers related to airports, geographic coordinates related to the airports, and frequencies related to the airports.

19. The aircraft radio circuitry arrangement of claim 1, wherein the first and second transmit powers of the aircraft radio are selected to ensure adequate reception of CTAF transmissions within the geographic range surrounding the airport and to reduce propagation of CTAF transmissions beyond the geographic range surrounding the airport considering at least the distance between the airport and the aircraft in which the aircraft radio is present.

20. The aircraft radio circuitry arrangement of claim 1, wherein circuitry configured for receiving at least (i) an indication of an airport, (ii) a geographic range surrounding the airport, (iii) a CTAF frequency associated with the airport, and (iv) an altitude of the airport comprises:

circuitry configured for receiving at least (i) an indication of an airport, (ii) a geographic range surrounding the airport (iii) a CTAF frequency associated with the airport, and (iv) an altitude of the airport, wherein receiving the geographic range surrounding the airport includes at least receiving at least one set of geographic coordinates bounding an area surrounding the airport in at least two dimensions.

21. An aircraft radio configured for reducing effects of Common Traffic Advisory Frequency (CTAF) radio congestion, comprising:
- at least one processing device; and
- at least one non-transitory medium coupled with the at least one processing device bearing one or more instructions which, when executed by the at least one processing device, cause the at least one processing device to perform one or more operations including at least:
    - receiving at least (i) an indication of an airport, (ii) a geographic range surrounding the airport, (iii) a CTAF frequency associated with the airport, and (iv) an altitude of the airport;
    - determining a first distance between the aircraft radio and the airport;
    - obtaining a first altitude of the aircraft radio;
    - providing an indication of a first transmit power of the aircraft radio for transmissions by the aircraft radio via the CTAF frequency associated with the airport based at least in part on (a) the determined first distance between the aircraft radio and the airport, (b) the geographic range surrounding the airport, (c) the obtained first altitude of the aircraft radio, and (d) the altitude of the airport; and
    - providing an indication of a second transmit power of the aircraft radio for transmissions by the aircraft radio via the CTAF frequency associated with the airport based at least in part on (a) a determined second distance between the aircraft radio and the airport, (b) the geographic range surrounding the airport, (c) an obtained second altitude of the aircraft radio, and (d) the altitude of the airport,
- wherein the second transmit power of the aircraft radio for transmissions by the aircraft radio via the CTAF frequency associated with the airport is operable to alter, from the first transmit power of the aircraft radio, a distance which transmissions by the aircraft radio via the CTAF frequency associated with the airport will propagate from the aircraft radio towards the geographic range surrounding the airport at least as a function of the determined second distance between the aircraft radio and the airport and as a function of the obtained second altitude of the aircraft radio.

* * * * *